United States Patent [19]

Allen et al.

[11] Patent Number: 4,528,321

[45] Date of Patent: Jul. 9, 1985

[54] POLYMER DISPERSIONS AND THEIR PREPARATION

[75] Inventors: Adrian S. Allen, North Yorkshire; Peter Flesher, West Yorkshire, both of England

[73] Assignee: Allied Colloids Limited, Bradford, England

[21] Appl. No.: 595,137

[22] Filed: Mar. 30, 1984

[30] Foreign Application Priority Data

Apr. 6, 1983 [GB] United Kingdom ................ 8309275

[51] Int. Cl.$^3$ .......................... C08K 5/05; C08K 5/06; C08L 33/00; C08L 35/00
[52] U.S. Cl. .................................... 524/761; 524/764; 524/767; 524/800; 524/801; 524/804; 526/910; 526/911
[58] Field of Search ............... 524/761, 764, 767, 800, 524/801, 804; 526/910, 911

[56] References Cited

U.S. PATENT DOCUMENTS

| | | | |
|---|---|---|---|
| 2,982,749 | 5/1961 | Friedrick et al. | 526/207 |
| 3,284,393 | 11/1966 | Vanderhoff et al. | 524/801 |
| 4,052,353 | 10/1977 | Scanley | 526/207 |
| 4,150,210 | 4/1979 | Anderson et al. | 526/911 |
| 4,328,149 | 5/1982 | Morse et al. | 524/804 |

FOREIGN PATENT DOCUMENTS

| | | | |
|---|---|---|---|
| 2629655 | 1/1977 | Fed. Rep. of Germany | 524/767 |
| 56-112946 | 9/1981 | Japan | 524/761 |
| 1499731 | 2/1978 | United Kingdom . | |

*Primary Examiner*—Ronald W. Griffin
*Attorney, Agent, or Firm*—Lawrence Rosen

[57] ABSTRACT

A dispersion of water soluble or water swellable polymer in water immiscible liquid is made by reverse phase polymerization utilizing a dispersing system comprising a polymerization stabilizer and the resulting dispersion, optionally after dehydration, may be distributed into water utilizing a distributing system. The dispersing system or the distributing system, or both, includes at least one non-ionic compound selected from $C_{6-12}$ alkanols, $C_{4-12}$ alkylene glycol monoethers and their $C_{1-4}$ alkanoates, $C_{6-12}$ polyalkylene glycol monoethers and their $C_{1-4}$ alkanoates and benzyl alcohol. Novel dispersions are made by reverse phase polymerization and, in particular, include a non-ionic compound selected from $C_{4-12}$ alkylene glycol monoethers, their $C_{1-4}$ alkanoates and $C_{6-12}$ polyalkylene glycol monoethers and their $C_{1-4}$ alkanoates. When the polymer is water soluble a solution of it in water can be made by distributing the dispersion into water.

17 Claims, No Drawings

POLYMER DISPERSIONS AND THEIR PREPARATION

It is well known to make a dispersion in water immiscible liquid of water soluble or water swellable polymer by forming a dispersion in the liquid of droplets of aqueous monomer in the presence of a dispersing system and then polymerising the monomer. This is called reverse phase polymerisation.

Depending on the materials and conditions used the polymerisation may be a reverse suspension polymerisation process or a reverse emulsion polymerisation process. Early disclosures of such processes are to be found in, for instance, U.S. Pat. Nos. 2,982,749 and 3,284,393. The water may be removed from the polymer particles, e.g. by azeotropic distillation, to form a dispersion of substantially anhydrous polymer particles in the non-aqueous liquid, for instance as described in U.S. Pat. No. 4,052,353 or British Pat. No. 1,499,731.

It is often desired to distribute the dispersion into water, for instance to form a solution of water soluble polymer or a thickened aqueous medium containing water swollen polymer, and to facilitate the distribution it is common to include a distributing system in the dispersion, the system generally being added after the formation of the dispersion and, if appropriate, dehydration of the dispersion. The distributing system normally includes a water soluble oil-in-water emulsifying agent.

The dispersion of aqueous monomer in water immiscible liquid is achieved by mechanically homogenising the aqueous monomer into the liquid. The dispersing system should fulfil various requirements. Thus it should assist the formation of this dispersion during mechanical homogenisation and should provide a sufficiently stable interfacial barrier to prevent reagglomeration of aqueous droplets after homogenisation. It should protect the droplets from coagulation during polymerisation and during subsequent treatment, for instance during distillation of water from the system. It should act as a dispersant for the resultant polymer particles such that the dispersion remains liquid without significant agglomeration or flocculation of the polymer particles. It should permit ready distribution of the dispersion into aqueous electrolyte or other water systems using minimal quantities of oil-in-water emulsifiers.

We find that it is generally necessary to use a dispersing system comprising a polymerisation stabiliser, which in practice is normally an amphipathic polymeric stabiliser. If the dispersing system consists solely of such a stabiliser there is a tendency for polymer particles to separate out from the dispersion during prolonged storage and it may be difficult to redisperse these settled particles. In some cases settlement arises because of a wide particle size distribution, the dispersion thus including a proportion of large particles which are not properly dispersed and so settle quickly. In other cases the particle size distribution may be more satisfactory but the particles may flocculate.

Settlement can be reduced by increasing the viscosity of the continuous phase by including viscosifiers or suspending agents in the dispersing system, for instance polymeric materials soluble in the continuous phase or lipophilic fatty amine modified clays. Another way of improving the dispersing system, and in particular of reducing the formation of large particles, is to include in the dispersing system an oil soluble, water-in-oil, emulsifier. This generally has an HLB value of from 4 to 6 and is normally included in the water immiscible liquid prior to homogenising the aqueous monomer into it. This assists in the breakdown of droplets to a smaller size but often quite high concentrations of emulsifier are required if significant improvement in settlement stability is desired and this has two serious disadvantages. It makes the dispersion much more viscous and it necessitates the use of a distributing system including quite large amounts of oil-in-water emulsifier, and in many cases even with very large amounts of emulsifier satisfactory distribution is not achieved.

The use of any type of synthetic emulsifier, either oil-in-water or water-in-oil, is in any event rather undesirable for various reasons. If the emulsifier gets into water that is to be discharged it can cause pollution. It can cause contamination of potentially potable water and can lead to increased risk of foam during use and possible aeration of polymer solutions or dispersions prepared by the use of such emulsifiers. Accordingly it is desirable to keep the concentrations in the dispersions of emulsifiers as low as possible. At present therefore one tends to have to tolerate either some settlement of polymer particles or risk the pollution and other problems associated with the use of increased levels of emulsifier.

It might be thought that satisfactory results could be achieved if the water immiscible liquid (which by definition is immiscible or only very slightly miscible with water) is replaced by a water miscible liquid. It is difficult, with such liquids, to obtain a satisfactory dispersion of the polymer but even if a dispersion is obtained there is the disadvantage that, upon contacting the dispersion with water, the polymer particles hydrate so rapidly that they become sticky before adequate distribution of them through the water. As a result there is tendency for the formation of undesirable large agglomerates of partially hydrated polymer.

Suitable oil-in-water emulsifiers are listed in British Pat. No. 1499731. They are included, in that Patent, in amounts of from 5 to 20% by weight based on the oil phase and clearly are present in amounts such that, upon stirring the dispersion into water, a stable oil-in-water emulsion is formed. As the wetting agent may be of low solubility in the immiscible liquid it is recommended to include solution promotors. Although reference is made to the use of higher aliphatic $C_6$–$C_7$ alcohols and cycloaliphatic alcohols with 6 to 10 carbon atoms both these statements seem to be misprints as these classes of materials are exemplified by decanol or undecanol ($C_{10}$ and $C_{11}$ alcohols) and decalin and tetralin (cycloalphatic hydrocarbons).

It is also known to disperse preformed solid particles into a non-aqueous liquid and to include an appropriate emulsifying agent or wetting agent to facilitate subsequent distribution and dissolution into water. Preformed solid particles generally have a particle size much larger than the particle size obtainable by reverse phase polymerisation, for instance above 100 microns compared to below 5 microns, and often have a wide particle size distribution and often have irregular shape.

We have now surprisingly found that satisfactory results can be achieved, with reduced levels of emulsifier, if we include a non-ionic compound of a defined class in the dispersing system or, if present, in the distributing system or in both the dispersing and distributing systems. According to the invention, a reverse phase polymerisation process for making a dispersion in water-immiscible liquid of water soluble or water swellable polymer comprises dispersing an aqueous solution of polymerisable monomer in water immiscible liquid in the presence of a dispersing system comprising a polymerisation stabiliser and polymerising the monomer, and optionally adding a distributing system for promoting distribution of the dispersion into water, and in this process at least one of the dispersing and distributing systems includes at least one non-ionic compound selected from $C_{6-12}$ alkanols, $C_{4-12}$ alkylene glycol monoethers and their $C_{1-4}$ alkanoates, $C_{6-12}$ polyalkylene glycol monoethers and their $C_{1-4}$ alkanoates, and benzyl alcohol, and in this process, when the dispersing system does not contain at least one of the said non-ionic compounds, the distributing system is added and includes at least one of the said non-ionic compounds and is either free of oil-in-water emulsifying agent or includes oil-in-water emulsifying agent in an amount insufficient by itself to result in formation of a stable oil-in-water emulsion upon stirring the dispersion into water. Both the dispersing and distributing systems may include one or more of the non-ionic compounds.

In one aspect of the invention the reverse phase polymerisation process is conducted in the presence of a dispersing system comprising a polymerisation stabiliser and at least one of the said non-ionic compounds. Preferred non-ionic compound for this purpose are selected from $C_{6-12}$ alkanols, $C_{6-12}$ polyalkylene glycol monoethers in which the etherifying group is $C_{1-4}$ alkyl, and the $C_{1-4}$ alkanoates of the said monoethers, and benzyl alcohol, with best results generally being achieved using non-ionic compounds selected from $C_{8-10}$ alkanols and diethylene glycol monobutyl ether and its acetate. Preferably the dispersing system comprises diethylene glycol monobutyl ether acetate (DGMBA). The amount of non-ionic compound included in the dispersing system is generally from 0.1 to 10%, preferably 1 to 6%, by weight of the weight of aqueous monomer solution.

The inclusion of the one or more non-ionic compounds in the dispersing system has various advantages. It reduces the risk of settlement of particles from the final dispersion, probably as a result of reducing the number and size of oversize particles, and thus reduces the range of particle sizes. It tends to reduce the average particle size. It permits satisfactory products being obtained using less water-in-oil emulsifier in the dispersing system. In some instances it results in the formation of a dispersion having lower viscosity. It renders the dispersion more easily distributed into water and as a result it may permit the use of a distributing system containing less oil-in-water emulsifier than would normally be required and indeed it may eliminate the need for any oil-in-water emulsifier.

Of course this aspect of the invention is of value irrespective of whether or not the final dispersion is to be distributed into water and irrespective of whether or not a distributing system is to be added to the dispersion.

In a second aspect of the invention distributing system is added to the dispersion and this distributing system includes at least one of the said non-ionic compounds. Compounds that are preferred for this purpose are selected from $C_{6-10}$ alkanols, $C_{4-12}$ alkylene glycol monoethers wherein the etherifying group is $C_{1-4}$ alkyl, $C_{6-12}$ dialkylene glycol monoethers wherein the etherifying group is $C_{1-4}$ alkyl, and benzyl alcohol. Diethylene glycol monobutyl ether (DGMBE) is particularly preferred but other suitable materials include ethylene glycol monobutyl ether and $C_{6-8}$ alkanols, especially $C_7$ or $C_8$ alkanols such as 2-ethylhexanol, heptan-1-ol and octan-1-ol. The amount of the non-ionic compound that is included in the distributing system is generally such that it is present in an amount of from 0.5 to 50%, and most preferably 2 to 25%, by weight of the water immiscible liquid.

The inclusion of the non-ionic liquid in the distributing system permits satisfactory distribution of the dispersion into water using less oil-in-water emulsifier than would otherwise be required and indeed often permits satisfactory distribution, including full emulsification of the water immiscible liquid, into the water simply by stirring and without the presence of any oil-in-water emulisifier. Naturally this aspect of the invention will be of particular value where the polymer is water soluble since, by the invention, it is possible to obtain by simple stirring dilute aqueous polymer solutions containing less emulsifier than has previously been required.

The dispersions made by the process are themselves novel materials. In particular an important new product according to the invention is a dispersion in water immiscible liquid of water soluble or water swellable polymer particles and which has been made by reverse phase polymerisation in that water immiscible liquid and which includes a non-ionic compound selected from $C_{4-12}$ alkylene glycol monoethers and their $C_{1-4}$ alkanoates and $C_{6-12}$ polyalkylene glycol monoethers and their $C_{1-4}$ alkanoates. Preferred dispersions include, as the non-ionic compound, ethylene glycol monobutyl ether or, preferably, diethylene glycol monobutyl ether or its acetate.

The polymers in the dispersions are normally formed from ethylenically unsaturated water soluble monomers. The polymers in the dispersions may be non-ionic, anionic, cationic or amphoteric. Typical non-ionic polymers are polyacrylamide and copolymers of acrylamide with, for instance, acrylonitrile or hydroxyethyl acrylate, polyvinyl alcohol or copolymers of vinyl alcohol with, for instance, vinyl acetate, and polyethylene oxide. Suitable anionic polymers include polymers formed from acrylic acid, methacrylic acid, vinyl sulphonic acid, sulphoethylacrylate, and 2-acrylamido-2-methyl propane sulphonic acid either alone or in combination and copolymers of one or more such monomers with non-ionic monomers such as acrylamide. Acidic monomers may be used as the free acid or as alkali metal, generally sodium or ammonium salts. Suitable cationic polymers include homopolymers, and copolymers with non-ionic monomers such as acrylamide, or dialkylaminoalkylacrylamides and dialkylaminoalkyl (generally ethyl) acrylates or methacrylates as inorganic or quaternary ammonium salts. Their molecular weight may be from, for instance, 1,000 to 50 million, often 100,000 to 30 million. If the polymer is to be water soluble it will generally be linear, although some branching or cross-linking may be permitted. If the polymer is to be water swellable then it will generally be cross-linked, as a result of including a polyethylenically unsaturated monomer or other cross-linking agent in the monomers from which the polymer was formed. Suitable cross-linking agents for use with acrylic monomers include methylene bisacrylamide, methylol acrylamide and soluble polyethylene glycol diesters. The monomers used for forming the polymers should all be water soluble.

The water immiscible liquids are selected from those conventionally used for reverse polymerisation such as aliphatic, aromatic or naphthenic hydrocarbon solvent or oils, chlorinated hydrocarbons and aromatic or higher aliphatic esters such as fatty glycerides, dibutyl phthalate and di-octylphthalate. Mixtures may be used. The liquids are inert, non-solvents for the water soluble polymers and should be non-toxic.

The polymerisation stabiliser is usually an oligomeric or other polymeric material and can generally be defined as amphipathic, normally being a copolymer of one or more hydrophobic monomers with one or more hydrophilic monomers. Suitable materials are well known and include, for instance, polyhydroxy stearic acid-polyethylene glycol condensates, maleic polymers such as those described in U.S. Pat. No. 4,339,371 and, preferably, copolymers of hydrophilic acrylic monomers with hydrophobic acrylic monomers. For example, the hydrophobic monomers may be alkyl esters of acrylic or methacrylic acid or N-substituted alkyl acrylamides containing 8 to 24 carbon atoms in the alkyl group and optionally alkyl esters of acrylic or methacrylic acid containing 1 to 4 carbon atoms in the alkyl group. The hydrophilic monomers may be or are potentially anionic, cationic or non-ionic. Suitable anionic monomers have the formula $$CH_2=CR^1CO(-OCH_2CHR^1CO-)_aOH$$

where $R^1$ is hydrogen or methyl and a is 0 to 2. Suitable cationic monomers have the formula $$CH_2=CR^1COX(CH_2)_bNR_2R_3$$

where $R^1$ is hydrogen or methyl, $R^2$ and $R^3$ are $C_{1-4}$ alkyl, X is O or NH and b is 1, 2 or 3 together with their acid addition and quaternary ammonium salts, for instance wherein the nitrogen atom is substituted by a third $C_{1-4}$ alkyl group and the anion is chloride, methosulphate or ethosulphate. Suitable non-ionic monomers have the formula $$CH_2=CR^1COYB$$

where $R^1$ is hydrogen or methyl, Y is O or NH, B is hydrogen when Y is NH or B is $(CH_2CH_2O)_m(COC_cH_{2c}O)_pH$ where m is 1 to 20, c is 2, 3 or 5 and p is 0 to 10.

The preferred ratio of total moles of hydrophobic monomers to total moles of hydrophilic monomers is 20:1 to 1:2.5 depending on the type of monomers used to prepare the stabiliser, the monomers being polymerised in the dispersed aqueous monomer solution droplets and the polarity and chemical type of the liquid continuous phase used to prepare the dispersion. The stabilisers may be prepared by solution polymerisation of the monomers in a suitable solvent which may contain a suitable quantity of the polar non-ionic liquid such that the proportions of stabiliser interpolymer and polar non-ionic liquid are present in optimum proportions. The amount of stabiliser normally used is usually from 0.1% to 10% by weight but preferably 2% to 4% by weight of the weight of aqueous monomer solution.

It is normally desirable for the particle size of the monomer droplets and of the polymer droplets to be below 5 microns, preferably 0.3 to 3 microns and the monomer droplets should therefore be homogenised into the water immiscible liquid with sufficient energy to achieve this particle size. Preferably oil soluble water-in-oil emulsifier, typically having HLB of from 4 to 6, is included to facilitate the formation of the small particles. Emulsifiers that are conventional for reverse phase polymerisation may be used and include sorbitan monostearate, sorbiton monooleate, glyceryl monooleate and ethoxylated fatty alcohols. The amount of water-in-oil emulsifier that may be used is normally from 0.1% to 10% but preferably 0.5% to 5% by weight of the weight of aqueous monomer solution.

The concentration of monomers present before polymerisation or the concentration of polymer after polymerisation dissolved in the aqueous phase may vary from 20 to 80% by weight but is usually 35 to 70% by weight. The volume ratio of continuous phase to dispersed aqueous monomer solution or dispersed aqueous polymer gel may vary from 0.3 to 3.0 but is preferably 0.4 to 1.5.

Polymerisation may be initiated by any conventional manner, for instance by photo, redox or thermal initiation.

In the case where dispersions are distilled to remove water and other volatile components, the concentration of polymer in the dispersion may vary from 30 to 85% by weight but is normally 40 to 65% by weight. The amount of stabiliser present will vary from 0.1 to 60% by weight but in the preferred cases from 1 to 20% by weight on weight of continuous phase and the amount of polar liquid remaining will vary from 0.1 to 60% by weight but in the preferred cases from 1 to 30% by weight on weight of continuous phase. Depending on the volatility of the polar liquid and distillation conditions, some of the polar liquid may be distilled.

If an oil-in-water emulsifying agent is to be added, either to the final polymer dispersion (as part or all of a distributing system) or to water in which it is to be dispersed then any of the oil-in-water emulsifying agents conventionally used for such purposes may be used. Examples are given in, for instance, U.S. Pat. No. Re. 28,576. Since the distribution is normally achieved merely by stirring the amount of emulsifier must be such that emulsification of the water immiscible liquid is achieved merely by stirring. In any process of the invention the amount for this purpose is generally less than the amount that would be required if none of the specified non-ionic liquids were present in either the dispersing system or the distributing system.

It should be noted that the defined non-ionic compounds used in the invention are polar liquids, they preferably have boiling point above 180° C. and most preferably above 190° or 200° C., and they are not conventional emulsifiers. Thus conventional emulsifiers need to be present in a critical concentration for them to be effective and are substantially ineffective at lower concentrations. However the effectiveness of the defined non-ionic compounds, for instance in the distributing system, increases gradually with increasing concentration and this is an indication that they are working in an entirely different manner from conventional emulsifying agents. The optimum for any particular material can best be determined by experiment.

The mechanism by which the defined non-ionic compounds achieve their desired effect, especially in the distributing system, is not clear. Possibly it promotes interfacial turbulence at the interface between the dissolving water and the water immiscible liquid. Another possibility is that it forms, with the water immiscible liquid, a film of a permeable liquid around each polymeric particle and enclosing that particle while the particle dissolves sufficiently in water that permeates through the permeable liquid that the particle will not undergo serious agglomerate formation of it contacts other similarly dissolved particles. It seems that instead of stripping the enclosing liquid off the polymer particle when the dispersion is distributed into water (as is the intention in many existing processes) in the invention the film remains attached to the polymer and does not break until swelling, and possible dissolution, of the polymer particle is sufficiently complete. Solutions in water of water soluble polymers and made by the invention may be used for, for instance, flocculating inorganic or organic suspensions. Aqueous suspensions of the swellable polymers may be used as, for instance, thickeners, e.g. in printing pastes. Dry, generally swellable, polymers may also be used as, for instance, water wettable adhesives.

The following are examples of the invention.

EXAMPLE 1

A copolymer dispersion was prepared by inverse suspension polymerisation of an aqueous solution of acrylamide and acryloyloxyethylammonium chloride in a weight ratio of 58:42 in a continuous phase comprising suspension polymerisation stabiliser, Shell SBP11 and SPO60. The suspension was stabilised against agglomeration during polymerisation by adding dodecyl trimethyl ammonium chloride to the aqueous monomer and a 2:1 molar ratio copolymer of stearyl methacrylate-methacrylic acid to the hydrocarbon continuous phase. Polymerisation was effected using tertiary butyl hydroperoxide and sulphur dioxide. The resulting polymer gel suspension was distilled to give an anhydrous polymer dispersion of particle size range 0.2 to 2 microns in a hydrocarbon liquid containing 55% by weight of water soluble poly-(acrylamide-co-acryloyloxy-ethylammonium chloride).

To a portion of the dispersion was added 10% by weight of SPO60 giving a copolymer dispersion of 50% copolymer by weight in SPO60.

To another portion of the dispersion was added 10% by weight of DGMBE to give a copolymer dispersion of 50% copolymer in a liquid or composition 4.5:1 by weight of SPO60:DGMBE.

The rate of dissolution of the copolymer in these two dispersions was determined by stirring 40 gms in dispersion into 1960 gms of water for 1 minute using a Heidolph RZR1 stirrer with a 5 cm diameter four blade propeller type stirrer fitted at 430 rpm. The aqueous mixture was left to stand static and viscosities measured with time using a Brookfield RVT viscometer at 20 rpm.

Similarly, 1% polymer solutions were prepared, but stirring at 430 rpm was continued throughout.

Another series of viscosity measurements were taken for 1% polymer solutions, left static after stirring at 3,500 rpm for 1 minute using a Greaves ST.A. type mixer. The results are given in the following table:

|  | VISCOSITY (cps) | | | | | |
|---|---|---|---|---|---|---|
|  | Stirred at 430 rpm | | | | Stirred at 3,500 rpm | |
|  | Polymer in SPO60 | | Polymer in 4.5:1 SPO60:DGMBE | | Polymer in SPO60 | Polymer in 4.5:1 SPO60:DGMBE |
| Time (min) | Static | Stirred | Static | Stirred | Static | Static |
| 1 | 7.5 | 7.5 | 820 | 870 | 10 | 2350 |
| 2.5 | 0 | 10 | 900 | 920 | 120 | 2500 |
| 5 | 26 | 25 | 1020 | 1030 | 700 | 2760 |
| 10 | 34 | 30 | 1130 | 1120 | 1150 | 2950 |
| 15 | 60 | 55 | 1280 | 1220 | 1400 | 3250 |
| 30 | 130 | 140 | 1650 | 1570 | 1800 | 3300 |
| 60 | 160 | 165 | 1970 | 1950 | 2200 | 3300 |
| 120 | 250 | 260 | 2400 | 2550 | 2400 | 3300 |
| 180 | 320 | 350 | 2700 | 2850 | 2500 | 3300 |

These results indicate the following:

(a) Once the polymer suspension or dispersion is broken down into droplets in water, the viscosity development is purely a function of water diffusing into the particles. Further stirring has no signficant effect on the rate of dissolution of the polymer.

(b) The rate of dissolution of the polymer is related to the size of the polymer suspension droplets initially formed in the water. Faster initial stirring increases the subsequent rate of dissolution since there is a greater surface area of carrier liquid in contact with water.

(c) The rate of dissolution of copolymer encapsulated by a liquid mixture of the invention is very significantly increased compared to oil alone. In the case of high speed initial stirring for 1 minute followed by static dissolution, polymer encapsulated in the liquid mixture was completely dissolved within 30 minutes compared to well over 3 hours for polymer dispered in oil alone.

In the following examples various stabilisers are mentioned. These are all introduced into the examples as solutions made by solution polymerisation in a liquid, that may include some of the desired non-ionic compound. The proportions by weight of monomers that are polymerised and solvent for the polymerisation are set out below in Table 1. Before use, stabiliser c is reacted in solution with 8.1 parts by weight dimethyl sulphate.

TABLE 1

|  | A | B | C | D | E | F | G |
|---|---|---|---|---|---|---|---|
| CSMA | 132.5 | 131.3 | 138.8 | 126.7 | 131.3 | 106.5 | 100 |
| MAA | 17.5 | 18.7 |  |  | 18.7 | 9.9 | 25 |
| MMA |  |  |  |  |  | 108.6 |  |
| HEMA |  |  |  | 23.3 |  |  |  |
| HEMA-CAPA-6 |  |  |  |  |  |  | 25 |
| DMAEMA |  |  | 11.2 |  |  |  |  |
| SBP11 | 600 | 350 | 350 | 262.5 | 175 |  | 175 |
| DGMBEA |  |  |  | 87.5 | 175 | 210 | 175 |
| DBP |  |  |  |  |  | 315 |  |

In this Table
CSMA = Ceto-stearyl methacrylate
MAA = Methacrylic acid
MMA = Methyl methacrylate
HEMA = Hydroxyethyl methacrylate
HEMA-CAPA-6 = Hydroxyethylmethacrylate condensed with 6 moles of caprolactone
DMAEMA = Dimethylaminoethylmethacrylate
SBP11 = A hydrocarbon fraction 'Shell SBP11'
DBP = Dibutyl phthalate TABLE 1-continued

| | A | B | C | D | E | F | G |
|---|---|---|---|---|---|---|---|
| AZDN = | Azo-bis-isobutyronitrile | | | | | | |
| DMS = | Dimethylsulphate | | | | | | |
| DGMBEA = | Diethylene Glycol mono butyl ether acetate | | | | | | |

EXAMPLE 2

Preparation of acrylamide-sodium acrylate copolymer dispersions using various polar liquid additives Dispersions were prepared using 3% by weight of Stabiliser B and 4% weight of polar liquid on weight of aqueous monomer solution according to the following recipe and method:

| AQUEOUS MONOMER SOLUTION: | |
|---|---|
| Acrylamide (51.4% aqueous solution) | 183 gms |
| Acrylic Acid | 50 gms |
| Tetralon B | 1.4 gms |
| Water | 104 gms |
| Sodium Hydroxide (46%) approx. | 60 gms |
| Adjusted to pH 7.0 ± 0.1 | |
| NON-AQUEOUS CONTINUOUS PHASE: | |
| Stabiliser B (30% w/w) | 39.8 gms |
| Polar Liquid | 16 gms |
| Pale Oil 60 | 107.8 gms |
| SBP 11 | 125.6 gms |

Tetralon B is a 40% aqueous solution of penta-sodium diethylene triamine penta-acetic acid.

The aqueous monomer solution was poured into the non-aqueous phase whilst stirring with a Silverson Homogeniser set on medium speed. When all the aqueous monomer solution had been added, the homogeniser speed was increased to maximum and continued for 30 minutes whilst cooling to keep the dispersion at a temperature of 20°–25° C. throughout. The suspension was deoxygenated by bubbling with nitrogen gas for 30 minutes whilst stirring the suspension at a rate sufficient to produce a vortex. The nitrogen gas flow rate was decreased to a slow rate sufficient to maintain an inert atmosphere and the gas diffusion tube withdrawn out of the suspension.

The required amount of tertiary-butyl hydroperoxide solution (9 mls of 0.1% w/v in SBP 11) was added and allowed 5 minutes to equilibrate throughout the suspension then a solution of sulphur dioxide in SBP 11 was fed in via a peristaltic pump at a rate of 0.8 mls per minute of 0.05% w/v solution until no further temperature rise was observed from the polymerisation. The resulting aqueous polymer gel dispersion was distilled under reduced pressure (15 Torr) up to a temperature of 95° C. to remove water and SBP 11. The resulting dehydrated concentrated polymer dispersion was cooled and discharged.

The distilled dispersions were analysed for polymer content by precipitation using acetone, filtration and drying to constant weight at 100° C. in a fan heated oven. The dispersions were then adjusted to 50.0% solids by weight by diluting with Pale Oil 60. A sample of each 50.0% dispersion was further diluted to 25% solids by weight using SBP 11.

The 50% dispersions in Pale Oil 60 and the 25% dilutions in SBP 11 were subjected to an accelerated settlement test in which 40 gms of dispersion were weighed into a pre-weighed 50 ml centrifuge tube and centrifuged at 1250 g for 30 minutes. The supernatant liquid was drained off the settled solids and the tube and settled solids re-weighed. The percentage settlement of solids was determined using the following expression:

$$\% \text{ Settlement} = \frac{\text{Wt. of sediment}}{\text{Wt. of solids in the dispersion}} \times 100$$

The values are recorded in Table 2.

TABLE 2

| POLAR LIQUID | 50% Solids | 25% Solids |
|---|---|---|
| None | 20.7 | 118 |
| Hexanol | 9.2 | 107 |
| Iso-Octanol | 6.4 | 80 |
| Iso-Decanol | 4.6 | 79 |
| Dodecanol | 6.3 | 95 |
| DGMBEA | 5.7 | 67 |
| DGMBE | 7.3 | 110 |

EXAMPLE 3

Various homopolymers and copolymers were made by the general technique of Example 2 using the stabilisers identified above. The settlement value was determined as in Example 2. The results are shown in Table 3 below. In this Table the amount of stabiliser and DGMBEA are by weight of the aqueous phase, and the amount of polymer is by weight of the dispersion. AM stands for acrylamide, AA for acrylic acid (polymerised in the presence of sodium hydroxide), TAEC for trimethyl beta acryloxy ethyl ammonium chloride and TMEAC trimethyl beta methacryloxy ethyl ammonium chloride. The column headed "polymer by weight" denotes the type of polymer and the proportions by weight of the monomers.

TABLE 3

| Dispersion | Stabiliser % w/w and | DGMBEA % w/w | Polymer % w/w | Polymer (by weight) | Settlement % |
|---|---|---|---|---|---|
| 1 | 1A | 0 | 50.7 | 58AM/ | 69 |
| 2 | 1A | 1.25 | 50.7 | 42 TAEAC | 31 |
| 3 | 1A | 2.5 | 50.3 | | 18 |
| 4 | 3B | 0 | 53.0 | AM | 14 |
| 5 | 3B | 1.4 | 51.7 | | 7 |
| 6 | 3B | 3.5 | 52.6 | | 5 |
| 7 | 3B | 0 | 53.5 | 67AM/ | 54 |
| 8 | 3B | 1.4 | 53.4 | 33AA | 29 |
| 9 | 3B | 3.5 | 53.9 | | 8 |
| 10 | 3C | 0 | 53.2 | 65AM/ | 23 |
| 11 | 3C | 1 | 52.6 | 35AA | 18 |
| 12 | 3C | 3 | 53.7 | | 9 |
| 13 | 3C | 5 | 53.9 | | 4 |
| 14 | 3D | 1.75 | 54.0 | 20AM/ | 7 |
| 15 | 2.25D | 1.31 | 53.8 | 80TMEAC | 32 |

TABLE 3-continued

| Dispersion | Stabiliser % w/w and | DGMBEA % w/w | Polymer % w/w | Polymer (by weight) | Settlement % |
|---|---|---|---|---|---|
| 16 | 1.5D | 0.875 | 53.9 | | 49 |
| 17 | 2.5E | 2.92 | 56.3 | 58AM/ 42 TAEAC | 4 |
| 18 | 2.0E | 2.33 | 55.8 | | 5 |
| 19 | 1.5E | 1.75 | 56.8 | | 25 |
| 20 | 3F | 2.8 | 50.0 | 70AM/ 30AA | 5.9 |
| 21 | 3G | 3.5 | 51.3 | 75AM/ 25AA | 7 |

EXAMPLE 4

A copolymer of acrylamide and acrylic acid was made by the general method of Example 2 but using 282 grams acrylamide, 150 grams acrylic acid, 675 grams water, about 187 grams 46% sodium hydroxide to give pH about 7, 129 grams stabiliser B (3%), 300 grams Pale Oil 60 and 500 grams SBP 11. Various of the non-ionic liquids were incorporated in the initial water immiscible liquid, in the amounts specified in Table 4. In some experiments sobiton monooleate (SMO) was also incorporated in the non-aqueous liquid. After dehydration various amounts of isopropylamine salt of dodecyl benzene sulphonic acid were added as oil-in-water emulsifier and each dispersion was then adjusted to 50% by weight polymer by adding Pale Oil 60. The percentaged settlement of the dispersion was determined as in Example 2. The dissolution properties in water were determined by injecting 5 grams of the dispersion into 400 grams tap water stirred initially with a four blade propeller stirrer and then with a low shear stirrer and the time taken to achieve a solution of maximum viscosity was determined, in minutes. The results are given in Table 4. The amounts for the non-ionic materials are in grams. The amounts for the oil-in-water emulsifier are by weight on the total dispersion. The values under S are the settlement values. The values under D are the time taken to achieve a solution of maximum viscosity or, where such a solution was not formed, the nature of the dispersion of oily globules in water (cd indicating a coarse dispersion and fd indicating a fine dispersion).

TABLE 4

| | A | | B | | C | | D | | E | |
|---|---|---|---|---|---|---|---|---|---|---|
| DGMBEA | 0 | | 39 | | 52 | | 0 | | 0 | |
| Iso-octanol | 0 | | 0 | | 0 | | 52 | | 0 | |
| Iso-decanol | 0 | | 0 | | 0 | | 0 | | 52 | |
| SMO | 52 | | 13 | | 0 | | 0 | | 0 | |
| Emulsifier | S | D | S | D | S | D | S | D | S | D |
| 0 | 22.4 | cd | 9.7 | — | 17.1 | — | 20.1 | — | 13.7 | — |
| 1 | 17.8 | cd | 8.0 | d | 9.7 | fd | 12.2 | fd | 14.4 | fd |
| 2 | 9.7 | cd | 6.2 | 5 | 8.0 | 20 | 7.5 | 2 | 14.2 | 90 |
| 3 | 7.4 | cd | 6.3 | 1 | 7.4 | 1 | 8.2 | 20 | 14.3 | 60 |
| 4 | 5.7 | d | 5.1 | 1 | 5.7 | 1 | 8.1 | 60 | 14.3 | 120 |
| 5 | 6.3 | fd | 4.0 | 1 | 5.1 | 1 | 8.1 | 60 | 14.4 | 90 |

These results indicate that replacement of the water-in-oil emulsifier by the defined polar liquids greatly facilitates the formation of a solution.

EXAMPLE 5

The process of Example 4 was repeated except that the copolymer was formed of 56 parts by weight acrylamide and 44 parts by weight acrylic acid (as sodium salt), the dispersion was not dehydrated, and the oil-in-water emulsifier that was added was a 7 mole ethoxylate of nonyl phenol. It was again found that dispersions formed using SMO and no polar liquid did, upon stirring with water, only give dispersions even when 5% of the water-in-oil emulsifier was added whilst dispersions formed using 1% SMO and 3.5% DEMBA gave a solution with only 1% of the emulsifier.

EXAMPLE 6

A portion of dispersion 17 of Example 3 was diluted to 50% polymer using Pale Oil 60. A second portion was diluted to 50% polymer using DGMBE. 40 gram samples of each of these dispersions were stirred into water. The dispersions that had been diluted with oil dispersed into water only with difficulty and even after 3 hours had not achieved a solution of constant viscosity. The solutions diluted with DGMBE dissolved easily into water.

EXAMPLE 7

Water swellable but insoluble copolymers were prepared by the method given in Example 2 using various water immiscible liquids and an aqueous monomer solution that contained 250 ppm methylene bisacrylamide, 86 g acrylic acid, 14 g acrylamide, 140 g water and 46 g ammonia solution (0.880).

The polymerised dispersions were distilled, analysed for polymer content and diluted to 25% solids with SBP11 then centrifuged and the % settlement determined as in Example 2.

The water immiscible liquids and the settlement values are shown in Table 5.

TABLE 5

| | A | B | C | D |
|---|---|---|---|---|
| DGMBEA | 0 | 16.6 (5.8%) | 0 | 8.0 (2.8%) |
| Stabiliser B | 47.8 (5%) | 47.8 (5%) | 22.9 (2.4%) | 22.9 (2.4%) |
| SMO | 0 | 0 | 4.6 (1.6%) | 4.6 (1.6%) |
| Pale Oil 150 | 83.8 | 67.2 | 86.7 | 78.7 |
| SBP 11 | 100 | 100 | 117.4 | 117.4 |
| Settlement % | 120.5 | 58.7 | 89.7 | 60.9 |

This shows the improved properties of dispersions B and D, which were of value as, for instance, printing paste thickeners.

We claim:

1. A reverse phase polymerization process for making a dispersion in water immiscible liquid of water soluble or water swellable polymer and comprising dispersing an aqueous solution of polymerizable monomer in water immiscible liquid in the presense of a dispersing system comprising a polymerization stabilizer and polymerizing the monomer, and in which the dispersing system includes at least one non-ionic compound selected from $C_{6-12}$ alkanols, $C_{4-12}$ alkylene glycol monoethers and their $C_{1-4}$ alkanoates, $C_{6-12}$ polyalkylene glycol monoethers and their $C_{1-4}$ alkanoates and benzyl alcohol.

2. A process according to claim 1 in which the non-ionic compounds are selected from $C_{6-12}$ alkanols, $C_{6-12}$ polyalkylene glycol monoethers wherein the etherifying group is $C_{1-4}$ alkyl and $C_{1-4}$ alkanoates of the said monoethers, and benzyl alcohol.

3. A process according to claim 1 in which the said non-ionic compound is selected from $C_{8-10}$ alkanols and diethylene glycol monobutyl ether and its acetate.

4. A process according to claim 1 in which the said non-ionic compound is diethyleneglycol monobutyl ether acetate.

5. A process according to claim 1 in which the amount of the said non-ionic compound is from 1 to 6% by weight of the aqueous monomer solution.

6. A process according to claim 1 in which the polymerisation stabiliser is a copolymer of hydrophilic and hydrophobic monomers.

7. A process according to claim 1 in which the dispersing system includes water-in-oil emulsifier and the particle size of the monomer droplets and polymer droplets is below 5 microns.

8. A reverse phase polymerisation process for making a dispersion in water immiscible liquid of water soluble or water swellable polymer and comprising dispersing an aqueous solution of polymerisable monomer in water immiscible liquid in the presence of a dispersing system comprising a polymerisation stabiliser and polymerising the monomer, and adding a distributing system for promoting distribution of the dispersion into water, and in which the distributing system includes at least one non-ionic compound selected from $C_{4-12}$ alkylene glycol monoethers and their $C_{1-4}$ alkanoates, $C_{6-12}$ polyalkylene glycol monoethers and their $C_{1-4}$ alkanoates and benzyl alcohol, and the distributing system includes oil-in-water emulsifier in an amount selected from zero and amounts insufficient to result in formation of a stable oil-in-water emulsion upon stirring the dispersion into water.

9. A process according to claim 8 in which the non-ionic compound is selected from $C_{4-12}$ alkylene glycol monoethers wherein the etherifying group is $C_{1-4}$ alkyl, $C_{6-12}$ dialkylene glycol monoethers wherein the etherifying group is $C_{1-4}$ alkyl, and benzyl alcohol.

10. A process according to claim 8 in which the non-ionic compound is selected from ethylene glycol monobutyl ether and diethylene glycol monobutyl ether.

11. A process according to claim 8 in which the said non-ionic compound is diethylene glycol monobutyl ether.

12. A process according to claim 8 in which the amount of the said non-ionic compound is from 2 to 25% by weight based on the weight of water immiscible liquid.

13. A process according to claim 8 in which the distributing system contains zero oil-in-water emulsifier.

14. A process according to claim 8 in which the dispersion is dehydrated before adding the distributing system.

15. A process according to claim 8 in which the polymer is water soluble.

16. A dispersion in a water immiscible liquid of water soluble or water swellable polymer particles and which has been made by reverse phase polymerisation in the water immiscible liquid and which includes a non-ionic compound selected from $C_{4-12}$ alkylene glycol monoethers, their $C_{1-4}$ alkanoates, $C_{6-12}$ polyalkylene glycol monoethers and their $C_{1-4}$ alkanoates.

17. A dispersion according to claim 16 in which the non-ionic compound is selected from ethylene glycol monobutyl ether, diethylene glycol monobutyl ether and diethylene glycol monobutyl ether acetate.

* * * * *